United States Patent
Lhamon

[19]

[11] Patent Number: 5,959,545
[45] Date of Patent: Sep. 28, 1999

[54] DOOR ACTUATED PAGER RECEIVER

[75] Inventor: Ruskin T. Lhamon, Holland, Mich.

[73] Assignee: Prince Corporation, Holland, Mich.

[21] Appl. No.: 08/790,723

[22] Filed: Jan. 31, 1997

Related U.S. Application Data

[60] Provisional application No. 60/019,773, Jun. 14, 1996.

[51] Int. Cl.⁶ .................................................. C08B 5/22
[52] U.S. Cl. ................................ 340/825.44; 307/10.2; 307/10.3
[58] Field of Search ................... 340/825.44, 825.34, 340/311.1, 825.47, 825.48, 825.31, 825.69; 315/84, 82, 83, 76, 77; 307/10.1, 10.2, 10.3, 10.4, 10.5, 10.6, 10.7, 10.8, 10.9

[56] References Cited

U.S. PATENT DOCUMENTS

| | | | |
|---|---|---|---|
| 3,723,967 | 3/1973 | Atkins et al. .......................... | 317/146 |
| 4,739,224 | 4/1988 | Geerlings . | |
| 4,914,716 | 4/1990 | Takahashi . | |
| 5,054,052 | 10/1991 | Nonami . | |
| 5,101,510 | 3/1992 | Duckeck . | |
| 5,153,582 | 10/1992 | Davis . | |
| 5,175,758 | 12/1992 | Levanto et al. . | |
| 5,274,843 | 12/1993 | Murai et al. . | |
| 5,287,553 | 2/1994 | Korycan . | |
| 5,313,515 | 5/1994 | Allen et al. . | |
| 5,321,309 | 6/1994 | Kolomyski . | |
| 5,384,564 | 1/1995 | Wycoff et al. . | |
| 5,418,537 | 5/1995 | Bird . | |
| 5,430,437 | 7/1995 | Ichikawa et al. . | |
| 5,479,157 | 12/1995 | Suman et al. . | |
| 5,485,163 | 1/1996 | Singer et al. . | |

FOREIGN PATENT DOCUMENTS

WO9214330  8/1992  WIPO .

*Primary Examiner*—Michael Horabik
*Assistant Examiner*—Jean B. Jeanglande
*Attorney, Agent, or Firm*—Price, Heneveld, Cooper, DeWitt & Litton

[57] ABSTRACT

A pager is powered by the vehicle's battery and coupled to a power control circuit for selectively applying power to the pager upon an operator initiated event. In a preferred embodiment of the invention, the power control circuit is controlled by a switch associated with the movement of a door handle for providing power to the pager for a predetermined period of time.

18 Claims, 2 Drawing Sheets ies, paging messages either cannot be received if the cellular telephone or paging receiver are inactivated or, if they are powered, significant battery drain can result. Over a period of time, the vehicle's battery, particularly in winter climates during cold weather, can be significantly discharged.

DOOR ACTUATED PAGER RECEIVER

CROSS-REFERENCE TO RELATED APPLICATION

This application claims priority under 35 U.S.C. §119(e) on U.S. Provisional Application No. 60/019,773 filed on Jun. 14, 1996, the disclosure of which is incorporated herein by reference.

BACKGROUND OF THE INVENTION

The present invention relates to a paging receiver for use in a vehicle and one which is selectively operated by the operation of the door handle of the vehicle for conserving battery energy.

Two-way communications between vehicles and base stations are becoming commonplace with cellular telephones being one of many popular means of communications. Paging receivers also have been employed in vehicles and can be used, for example, for the programming of vehicle options through a dealer network as taught in U.S. Pat. No. 5,479,157. One difficulty with utilization of a cellular telephone or paging receiver is that when the operator is not in the vehicle and the vehicle is not in operation, paging messages either cannot be received if the cellular telephone or paging receiver are inactivated or, if they are powered, significant battery drain can result. Over a period of time, the vehicle's battery, particularly in winter climates during cold weather, can be significantly discharged.

SUMMARY OF THE PRESENT INVENTION

It is desirable, therefore, to provide a paging receiver with the capability of selectively receiving messages when desired and activating the receiver upon an operator initiated event. Thus, the pager receiver can normally be in a "sleep" mode or deactivated and powered only when the vehicle is in operation or selectively actuated by an operator. One such event can, for example, be the movement of the vehicle door handle indicating the operator is entering the vehicle, which activates the pager receiver. Paging messages can be stored by a land station for transmission once the paging transceiver has been activated and transmits a signal to the base station indicating stored messages should be transmitted.

One useful application of such a system is in the event an operator locks his or her keys in the vehicle and only upon return to the vehicle discovers such mishap. By moving the door handle, the paging transceiver is powered for a predetermined time, sufficient for the vehicle operator to call a subscription service which can then transmit, based upon the personal identification number of the operator and vehicle identification, a signal to the pager receiver which will unlock the vehicle doors, allowing access to the vehicle for the operator. This signal can be sent at a prescribed time or window of time as agreed upon between the operator and the subscription service to prevent theft of the vehicle.

The system of the present invention, therefore, incorporates within a vehicle a communication system which is powered by the vehicle's battery and which is coupled to a power control circuit for selectively applying power to the communication device upon operator control when the operator is in the vehicle or upon an operator initiated event when the vehicle is not in operation. In a preferred embodiment of the invention, a two-way radio communication device is employed which has an output for providing signals which can be decoded and utilized for controlling vehicle operations, such as electrical door locks. The power control circuit is coupled between the two-way communication device and the vehicle's battery and, in one embodiment of the invention, is selectively controlled by a switch associated with the movement of an external door handle for providing power to the two-way communication device for a predetermined period of time, after which power is again disconnected. In a preferred embodiment of the invention, the two-way communication device is in the form of a paging transceiver, although other one-way, two-way radio frequency or other energy utilizing devices can also be employed.

These and other features, objects and advantages of the present invention will become apparent upon reading the following description thereof together with reference to the accompanying drawings.

DETAILED DESCRIPTION OF THE PREFERRED EMBODIMENT

Figure 1:
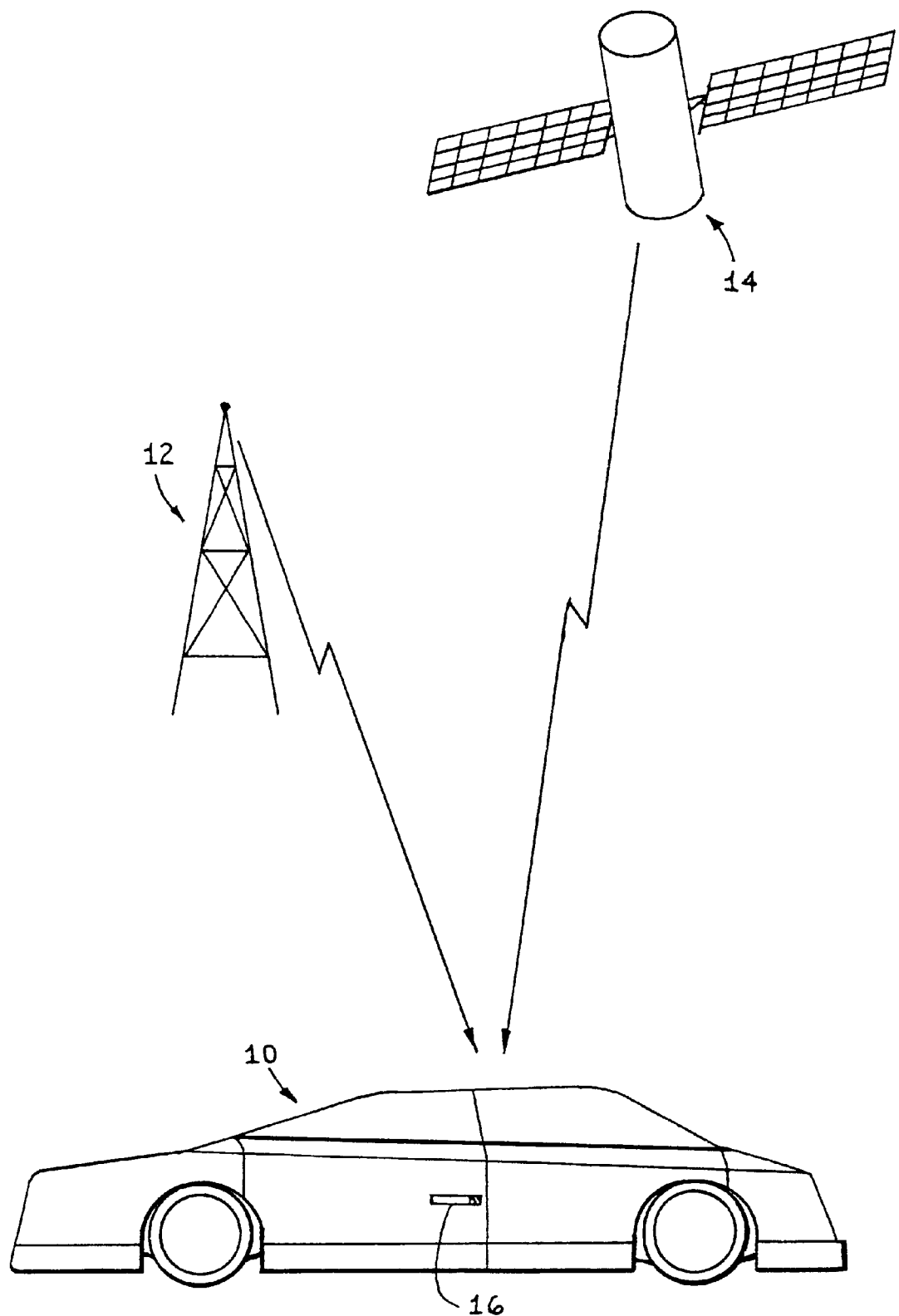
FIG. 1 is a pictorial representation of a vehicle and two-way communication system with a subscription service.

Referring initially to FIG. 1, there is shown a vehicle 10, such as an automobile, which is equipped with a two-way pager 20 (FIG. 2) or other RF frequency communication system, which may be in the form of a cellular telephone or radio selectively coupled to the vehicle's power system. The vehicle operator, thus, has the ability to communicate with a subscription service such as by using a cellular phone network represented by the tower illustration 12 in FIG. 1. Preferably, the two-way communication is a relatively high frequency two-way paging transceiver which communicates to the subscription service through a satellite link system as represented by the satellite 14 in FIG. 1. These communication devices are widely commercially available and can receive a variety of signals, including coded signals which may be coupled through modems or other decoding devices such that, in addition to voice or paging messages, other signals can be transmitted to the vehicle for control of vehicle accessories. One such system is disclosed in U.S. Pat. No. 5,479,517. In addition, two-way paging systems are now commercially available and likewise can receive not only voice and alpha-numeric messages but also can receive control signals for subsequent use in controlling vehicle functions. Thus, either of the communication systems 12 or 14 or other RF communication systems can be employed in communicating with the vehicle mounted receiver compatible with the communication system to which the vehicle operator subscribes. The vehicle 10 includes at least one door handle 16 which is provided with an electrical switch 18 (FIG. 2) for providing an actuation signal to at least temporarily activate the two-way communication system contained within the vehicle, whether it be a cellular telephone, pager transceiver, or other two-way communication device.

Figure 2:
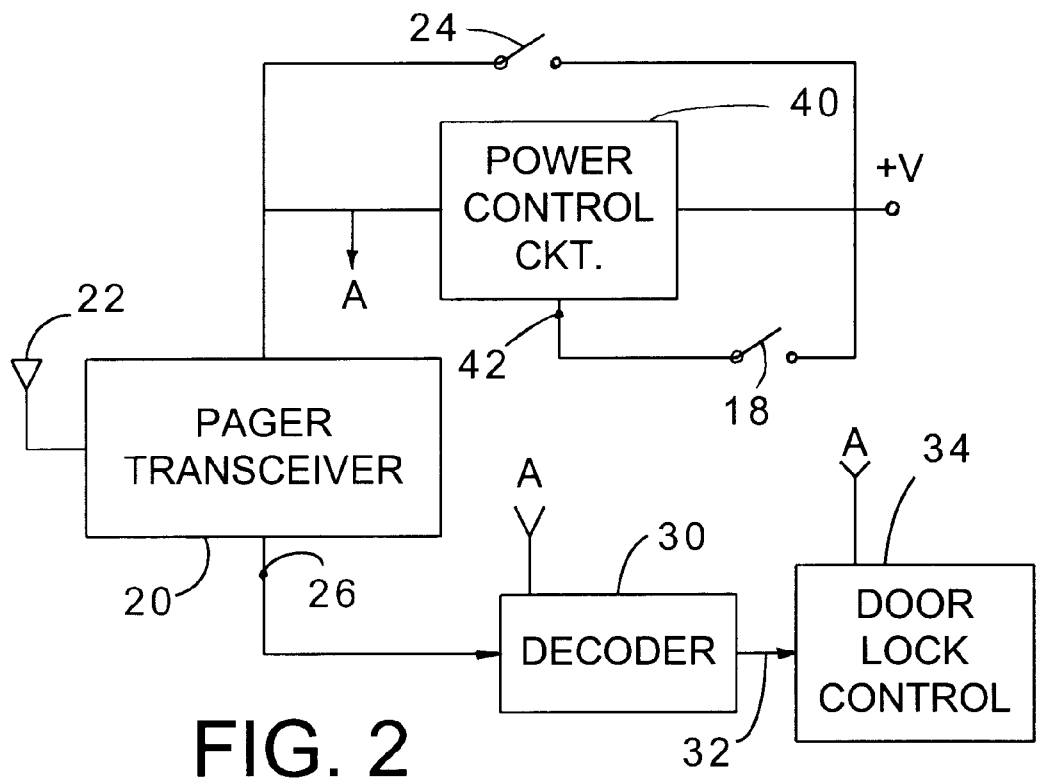
FIG. 2 is an electrical circuit diagram in block and schematic form of the system embodying the present invention.

Turning now to FIG. 2, the electrical circuit embodying the present invention is shown which includes, in the preferred embodiment, a two-way pager transceiver 20 including its own receiving/transmitting antenna 22. Transceiver 20 can generally be of the type commercially available from the Motorola Corporation and disclosed in U.S. Pat. No. 5,153,582 except that it is mounted to a vehicle console and is powered using the vehicle's battery. The transceiver is coupled to the vehicle's power supply represented by +V in FIG. 2 by means of an ignition switch 24 such that, when the vehicle's ignition is activated, power is supplied to the pager transceiver. Pager transceiver 20 includes, in addition to its internal audio output and visual displays, an output terminal 26 for providing encoded output signals. Typically, such signals are in a digital format and are applied to the input of a decoder circuit 30 which provides control signals at its output terminal 32 to a vehicle accessory such as a door lock control circuit 34 for unlocking the vehicle doors. The decoder circuit 30 may also be coupled to a vehicle's bus line in a conventional manner which, in turn, is coupled to a microprocessor in the vehicle to selectively operate a vehicle accessory upon receiving a control signal. Power for the accessory, the paging device and other circuits is provided by the power control circuit 40 of the present invention, as shown in FIG. 2.

The power control circuit 40 includes a solid state switch having a control input terminal 42 which responds to a control signal from door switch 18 for coupling the +V supply from the vehicle's battery to output terminal "A". Terminal A is coupled inter alia to the pager transceiver 20 for supplying operating power to the pager transceiver in the event a control signal is received at input terminal 42 by the actuation of the outside door handle 16, which is mechanically coupled to switch 18, momentarily closing switch 18. This provides a logic "1" signal to the central input of the power control circuit 40. The power control circuit 40 may include a time delay such that the pager transceiver receives power from circuit 40 for a predetermined period of time. The time can be selected by conventional timing circuits to select a period of, for example, from 10 to 30 minutes to provide the operator sufficient time to contact a subscription service for receiving vehicle control signals therefrom in a prearranged schedule. The power control circuit output terminal A thus provides in response to the actuation of a vehicle operator initiated event, such as movement of door handle 16 (FIG. 1) and closure of switch 18 (FIG. 2), power at output terminal A which is used to power pager transceiver 20. Output terminal A is also coupled to the decoder circuit 30 and the door lock control circuit 34 for providing operating power to these circuits for the same time period.

Figure 3:
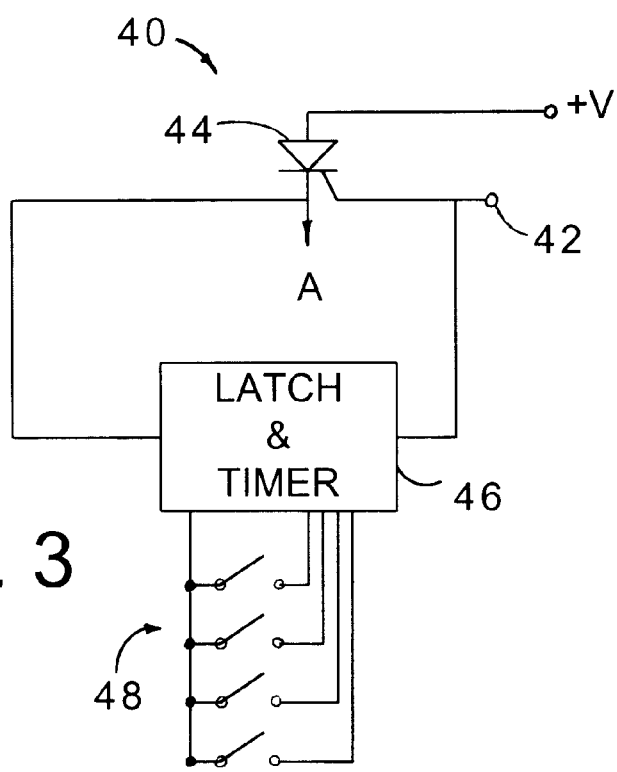
FIG. 3 is a detailed electrical circuit diagram in block and schematic form of the power control circuit shown in FIG. 2.

The power control circuit 40 includes a solid state switch 44 (FIG. 3) such as an SCS with an anode coupled to the +V supply and a cathode coupled to output terminal A. The gate is coupled to input terminal 42 for receiving an actuation control signal for turning the SCS on, providing power from the +V terminal to output terminal A. A latch and timer circuit 46 is coupled between the cathode and gate terminals of the SCS 44 to latch the SCS in a conductive mode until such time as the timer circuit times out and the gate control signal is disabled. D.I.P. switches 48 or other operator programmable means are coupled to circuit 46 allow the operator to set the delay period, which, for example, can be selected for intervals of 10 minutes.

During normal use when the vehicle is in operation, the ignition switch 24 provides power to the pager transceiver such that messages can be received and transmitted through the two-way communication device 20 by the operator in a normal fashion. When the vehicle is parked, however, and the ignition switch 24 is shut off, the two-way communication device 20 is deactivated in order to save energy from the vehicle battery. Thus, when the vehicle is parked and unattended, the pager transceiver is deactivated. In the event messages are to be sent to the pager transceiver, the subscription service will temporarily store such messages until the paging receiver is awakened by the application of power thereto which can be programmed to send a signal to the subscription service indicating that the pager transceiver can now receive stored paging messages or control signals as now described.

In the event that the vehicle operator has locked his or her keys within the vehicle with the pager transceiver having no power, the subscription service cannot be utilized to unlock the vehicle door unless the operator provides an operator initiated event, such as lifting the external door handle 16 to momentarily close switch 18 which powers the paging transceiver 20 for a period of time as described above. This allows the operator to call the subscription service and, together with his or her personal identification number and the vehicle identification, the subscription service can send a door-unlock signal to the vehicle transceiver 20 which is decoded by decoder 30 and provides a control signal to the door lock control circuit 24 thereby unlocking the vehicle doors allowing access by the vehicle operator. The power control circuit delay can be selected either by the vehicle operator through the use of selectable time delays controlled by DIP switches or other conventional means which allow the operator the desired amount of time. Typically, the vehicle operator arranges a predetermined time or time period during which time a door-unlock signal is transmitted for unlocking the vehicle doors when the operator is present at the vehicle for gaining access. Upon entry into the vehicle, the operator also receives stored pager messages which can be transmitted by the subscription service when the pager receiver is powered through circuit 40.

It will become apparent to those skilled in the art that various modifications to the preferred embodiments of the invention as described herein can be made without departing from the spirit or scope of the invention as defined by the appended claims.

The embodiments of the invention in which an exclusive property or privilege is claimed are defined as follows:

1. A door-actuated paging receiver comprising:
   a receiver for receiving signals from a subscription service, said receiver including a power input selectively coupled to the vehicle's power supply for receiving operating power, said receiver including an output terminal for providing output signals from said receiver; and
   a power control circuit coupled between said power input of said receiver and the vehicle's battery,'said power control circuit including a switch actuated by an operator entering the vehicle for selectively applying power to said receiver.

2. The system as defined in claim 1 further includes a decoder coupled to said receiver output for decoding received signals and providing a vehicle accessory control output signal.

3. The system as defined in claim 2 further includes an accessory control circuit coupled to said decoder circuit and responding to an accessory control output signal for controlling a vehicle accessory.

4. The system as defined in claim 3 wherein said switch of said power control circuit is an electrically operated switch and a latching circuit for latching said switch in a closed position in response to the vehicle initiated event for a predetermined period of time.

5. The system as defined in claim 4 further includes a door actuated switch coupled to a vehicle door to be actuated momentarily upon movement of the external vehicle door handle, said door actuated switch coupled between said power control circuit control input terminal and said vehicle battery for actuating said switch of said power control circuit to provide operating power to said receiver for a predetermined period of time.

6. A vehicle control system for remotely controlling vehicle accessories comprising:

a transceiver for receiving control signals from a subscription service, said transceiver selectively coupled to the vehicle's power supply for receiving operating power, said transceiver including an output terminal for providing control output signals; and a power control circuit coupled between said transceiver and the vehicle's battery, said power control circuit actuated by an operator opening a vehicle door for selectively applying power to said transceiver for a predetermined period of time and for transmitting a signal to a subscription service indicating that the system is enabled.

7. The system as defined in claim 6 further includes a decoder coupled to said output terminal of said transceiver for decoding received signals and providing a vehicle accessory control output signal.

8. The system as defined in claim 7 further includes an accessory control circuit coupled to said decoder circuit and responsive to said accessory control output signal for controlling an accessory.

9. The system as defined in claim 8 wherein said power control circuit includes a solid state switch and a latching circuit for latching said switch in a closed position for a predetermined period of time after an operator opens a vehicle door.

10. The system as defined in claim 9 further includes a switch coupled to an external vehicle door handle to be actuated momentarily upon movement of the external vehicle door handle, said switch coupled to an input of said power control circuit for actuating said power control circuit to provide operating power to said transceiver for a predetermined period of time.

11. The system as defined in claim 10 wherein said power control circuit includes an adjustable timer for selecting the time period during which power is applied to said transceiver in response to the actuation of said door actuated switch.

12. A vehicle energy control system comprising:

an electrically operated signal receiving device for receiving power from the vehicle's battery; and a power control circuit coupled between said device and the vehicle's battery, said power control circuit actuated by a vehicle operator initiated event for selectively applying power to said device, and further including a door actuated switch coupled to a vehicle door to be actuated momentarily upon movement of the external vehicle door handle, said switch coupled to said power control circuit control for actuating said power control circuit to provide operating power to said device upon movement of said door handle.

13. The system as defined in claim 12 wherein said power control circuit further includes an electrically operated switch and a latching circuit for latching said electrically operated switch in a closed position in response to the movement of the vehicle door handle for a predetermined period of time.

14. A vehicle energy saving system for an electrically operated communication device comprising:

a receiver for receiving communication signals, said receiver selectively coupled to the vehicle's power supply for receiving operating power; and a power control circuit coupled between said receiver and the vehicle's battery, said power control circuit actuated by a vehicle operator initiated event for selectively applying power to said receiver for a predetermined period of time to receive communication signals during said period of time, and further including a switch coupled to an external vehicle door handle to be actuated momentarily upon movement of the external vehicle door handle, said switch coupled to an input of said power control circuit for actuating said power control circuit to provide operating power to said receiver for said predetermined period of time.

15. The system as defined in claim 14 and further including a decoder coupled to said output terminal of said receiver for decoding received signals and providing a vehicle accessory control output signal.

16. The system as defined in claim 15 further includes an accessory control circuit coupled to said decoder circuit and responsive to said accessory control output signal for controlling an accessory.

17. The system as defined in claim 16 wherein said power control circuit includes a solid state switch and a latching circuit for latching said switch in a closed position in response to an operator initiated event for said predetermined period of time.

18. The system as defined in claim 17 wherein said power control circuit includes an adjustable timer for selecting the time period during which power is applied to said receiver in response to the actuation of said door actuated switch.

* * * * *